(12) United States Patent
Chien et al.

(10) Patent No.: US 11,455,918 B2
(45) Date of Patent: Sep. 27, 2022

(54) WARNING TRIANGLE STRUCTURE

(71) Applicant: Fulian Precision Electronics (Tianjin) Co., LTD., Tianjin (CN)

(72) Inventors: Yu-Ching Chien, New Taipei (TW); Chuang-Wei Tseng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 402 days.

(21) Appl. No.: 16/747,110

(22) Filed: Jan. 20, 2020

(65) Prior Publication Data

US 2021/0174712 A1 Jun. 10, 2021

(30) Foreign Application Priority Data

Dec. 10, 2019 (CN) .......................... 201911257477.7

(51) Int. Cl.
| | |
|---|---|
| *G09F 13/16* | (2006.01) |
| *B60T 1/02* | (2006.01) |
| *B60Q 7/00* | (2006.01) |
| *E01F 9/692* | (2016.01) |

(52) U.S. Cl.
CPC ............ *G09F 13/16* (2013.01); *B60Q 7/005* (2013.01); *B60T 1/02* (2013.01); *E01F 9/692* (2016.02)

(58) Field of Classification Search
CPC .. G09F 13/16; G09F 13/0463; G09F 13/0472; G09F 13/20; G09F 19/22; B60Q 7/005; B60T 1/02; B60T 17/22; E01F 9/692
See application file for complete search history.

(56) References Cited

U.S. PATENT DOCUMENTS

| | | | | |
|---|---|---|---|---|
| 4,593,265 A | * | 6/1986 | McKenney | ............. E01F 9/662 40/550 |
| 5,257,020 A | * | 10/1993 | Morse | ................... G09F 9/3026 340/471 |
| 7,268,701 B2 | * | 9/2007 | Rohl | ..................... G08G 1/0955 116/63 P |
| 8,164,483 B1 | * | 4/2012 | Phillips | ................... E01F 9/681 116/63 P |
| 9,235,210 B2 | * | 1/2016 | Zhang | ..................... G09F 13/16 |
| 9,242,600 B2 | * | 1/2016 | Al Shalabi | ............... B60Q 7/00 |

(Continued)

FOREIGN PATENT DOCUMENTS

| | | |
|---|---|---|
| CN | 201599363 U | 10/2010 |
| CN | 203876868 U | 10/2014 |

(Continued)

*Primary Examiner* — Nimeshkumar D Patel
*Assistant Examiner* — Tania Courson
(74) *Attorney, Agent, or Firm* — ScienBiziP, P.C.

(57) ABSTRACT

A warning triangle structure includes a base, a triangle, a number of connecting rods, and a braking device. The triangle includes a bottom end and a top end opposite the bottom end. The bottom end is fixedly mounted to the base. Each of the connecting rods includes a first end and a second end. The first end is fixedly coupled to the base, and the second end is mounted with a rotatable support wheel. The braking device is installed at the second end of at least one of the connecting rods. The braking device includes a transmission shaft coupled to the support wheel. The braking device controls the support wheel to stop rotating by stopping the transmission shaft from rotating.

10 Claims, 3 Drawing Sheets

(56) References Cited

U.S. PATENT DOCUMENTS

| | | | | |
|---|---|---|---|---|
| 9,601,012 | B2 * | 3/2017 | Williams | G08G 1/07 |
| D787,968 | S * | 5/2017 | Wu | D10/113.4 |
| 9,878,661 | B2 * | 1/2018 | Yang | B60Q 7/00 |
| 9,927,811 | B1 * | 3/2018 | Tseng | G05D 1/0088 |
| 9,972,205 | B2 * | 5/2018 | Beaulieu | E01F 9/30 |
| 10,301,785 | B2 * | 5/2019 | Huang | E01F 9/692 |
| 10,563,366 | B2 * | 2/2020 | Tseng | B62D 39/00 |
| 10,850,663 | B1 * | 12/2020 | Wang | G09F 13/16 |
| 11,161,453 | B2 * | 11/2021 | Lin | B60Q 7/005 |
| 11,236,475 | B2 * | 2/2022 | Lin | E01F 9/646 |
| 2015/0145667 | A1 * | 5/2015 | Al Shalabi | B60Q 7/00 340/473 |
| 2016/0122956 | A1 * | 5/2016 | Christiansen | G08G 1/0955 180/2.2 |
| 2018/0361926 | A1 | 12/2018 | Tseng et al. | |

FOREIGN PATENT DOCUMENTS

| | | | |
|---|---|---|---|
| CN | 204186843 U | 3/2015 | |
| CN | 107009957 A * | 8/2017 | B60Q 7/00 |
| CN | 107696968 A * | 2/2018 | |
| CN | 207047732 U | 2/2018 | |
| CN | 108638962 A * | 10/2018 | |
| CN | 109137781 A | 1/2019 | |
| DE | 102013104990 B4 * | 1/2015 | B22F 3/1055 |
| JP | 2021133924 A * | 9/2021 | E01F 9/608 |
| TW | 201905285 A | 2/2019 | |

* cited by examiner

WARNING TRIANGLE STRUCTURE

FIELD

The subject matter herein generally relates to warning triangle structures, and more particularly to a warning triangle structure having an improved stability.

BACKGROUND

Generally, a warning triangle structure is used to alert traffic of an accident. However, the warning triangle structure may be easy to be blown away by wind. Thus, a warning triangle structure that can meet wind-resistant requirements is desired.

BRIEF DESCRIPTION OF THE DRAWINGS

Implementations of the present disclosure will now be described, by way of embodiments, with reference to the attached figures.

DETAILED DESCRIPTION

Figure 1:
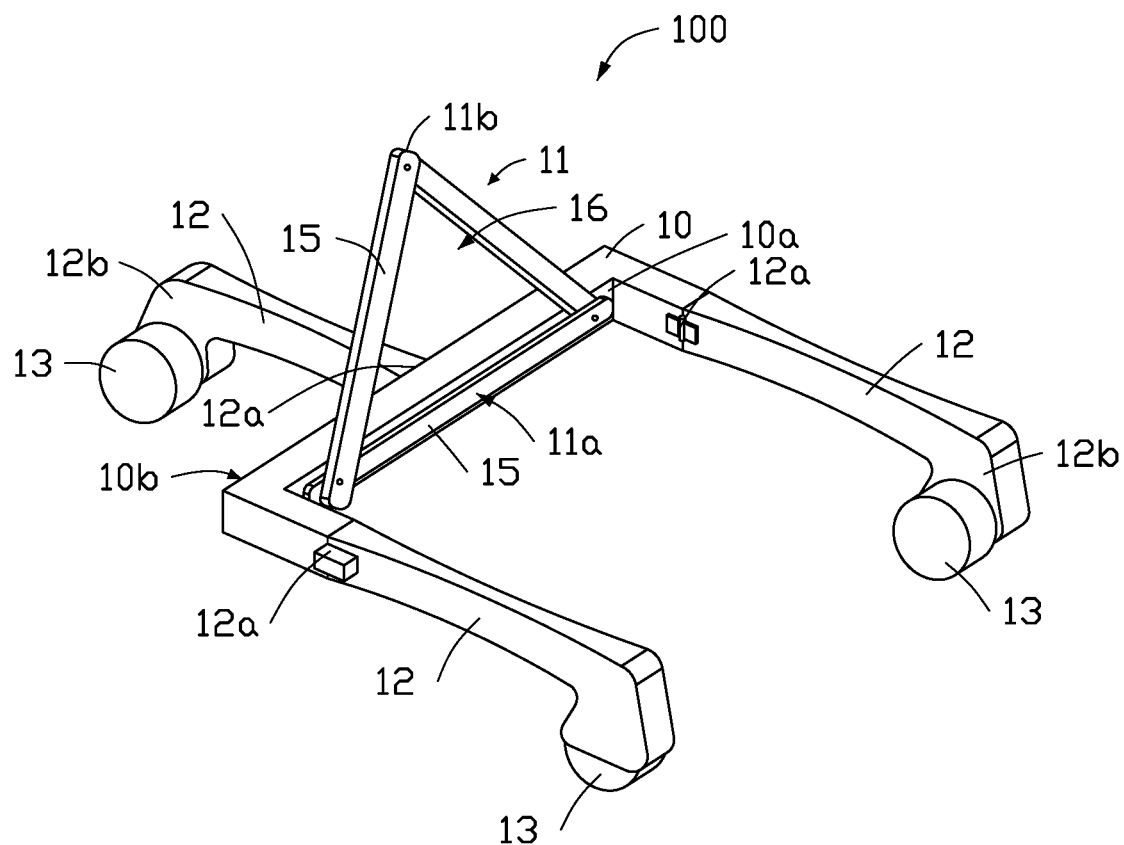
FIG. 1 is an assembled, isometric view of an embodiment of a warning triangle structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of a warning triangle structure 100. When an accident occurs, the warning triangle structure 100 is placed on the road and can withstand wind while acting as a warning sign. The warning triangle structure 100 includes a base 10, a triangle 11 fixedly mounted on the base 10, a plurality of connecting rods 12 fixedly connected to the base 10, and a support wheel 13.

The triangle 11 includes a bottom end 11a and a top end 11b opposite the bottom end 11a. The bottom end 11a of the triangle 11 is fixed on the base 10. The base 10 includes a front side 10a and a rear side 10b opposite the front side 10a.

In one embodiment, the triangle 11 is fixed on the front side 10a. An outer surface of the triangle 11 is coated with a reflective material and/or a fluorescent material for making the triangle 11 more visible at night. The triangle 11 includes three sides 15 connected in sequence from end to end. The three sides 15 form a triangle, and a through hole 16 is defined in a center of the triangle 11.

In one embodiment, the warning triangle structure 100 may include three connecting rods 12. Each of the three connecting rods 12 defines a first end 12a and a second end 12b. The first end 12a is fixedly connected to the base 10, and the second end 12b is mounted with the support wheel 13. In one embodiment, one of the three connecting rods 12 is fixed in a middle portion of the rear side 10b of the base 10, and the other two of the three connecting rods 12 are respectively fixed at opposite ends of the base 10 on the front side 10a. In other embodiments, the warning triangle structure 100 may include four connecting rods 12, such that two of the four connecting rods 12 are fixed on the front side 10a, and the other two of the four connecting rods 12 are fixed on the rear side 10b.

Figure 2:
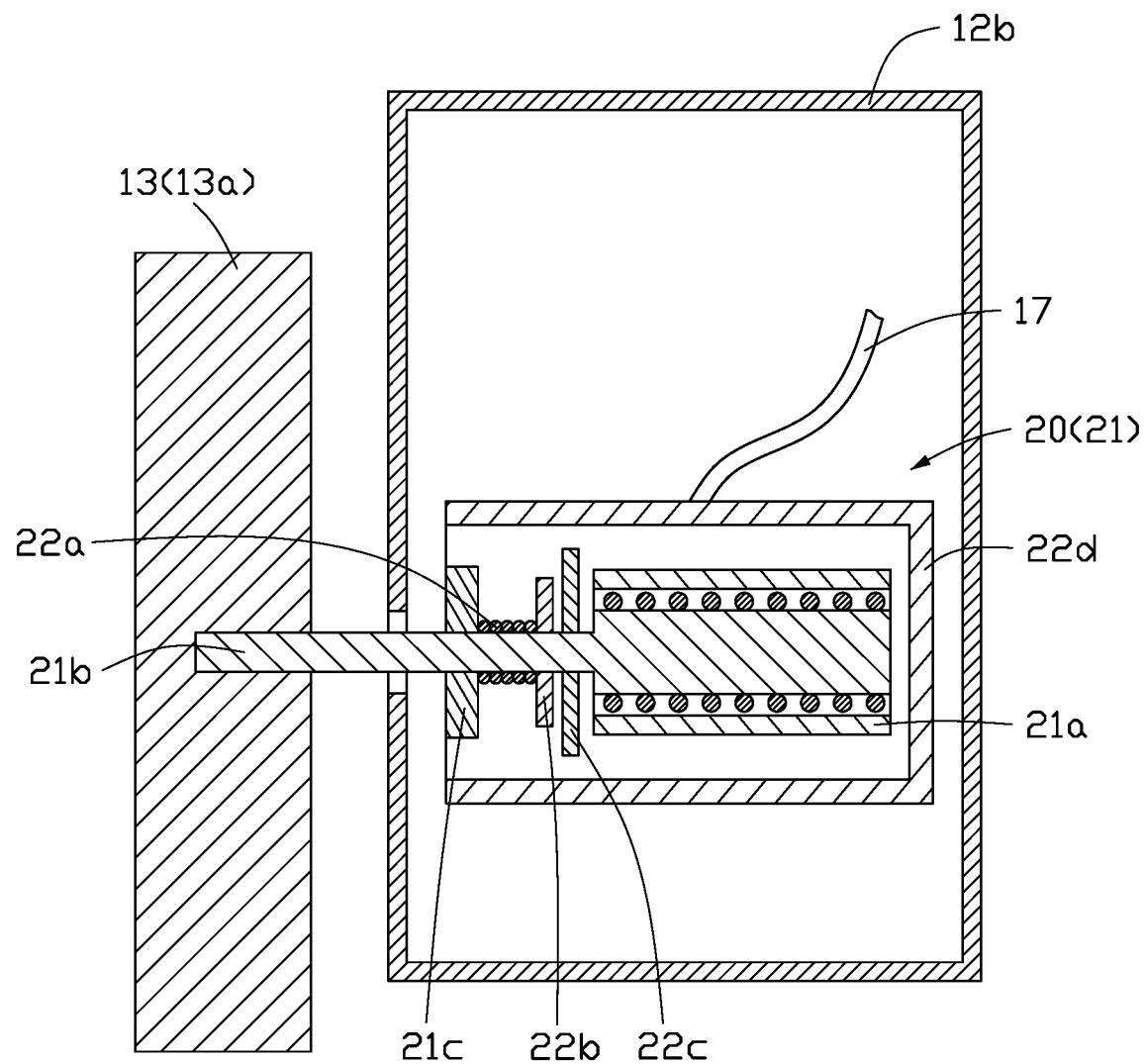
FIG. 2 is a schematic diagram of a first embodiment of a braking device of the warning triangle structure.
Figure 3:
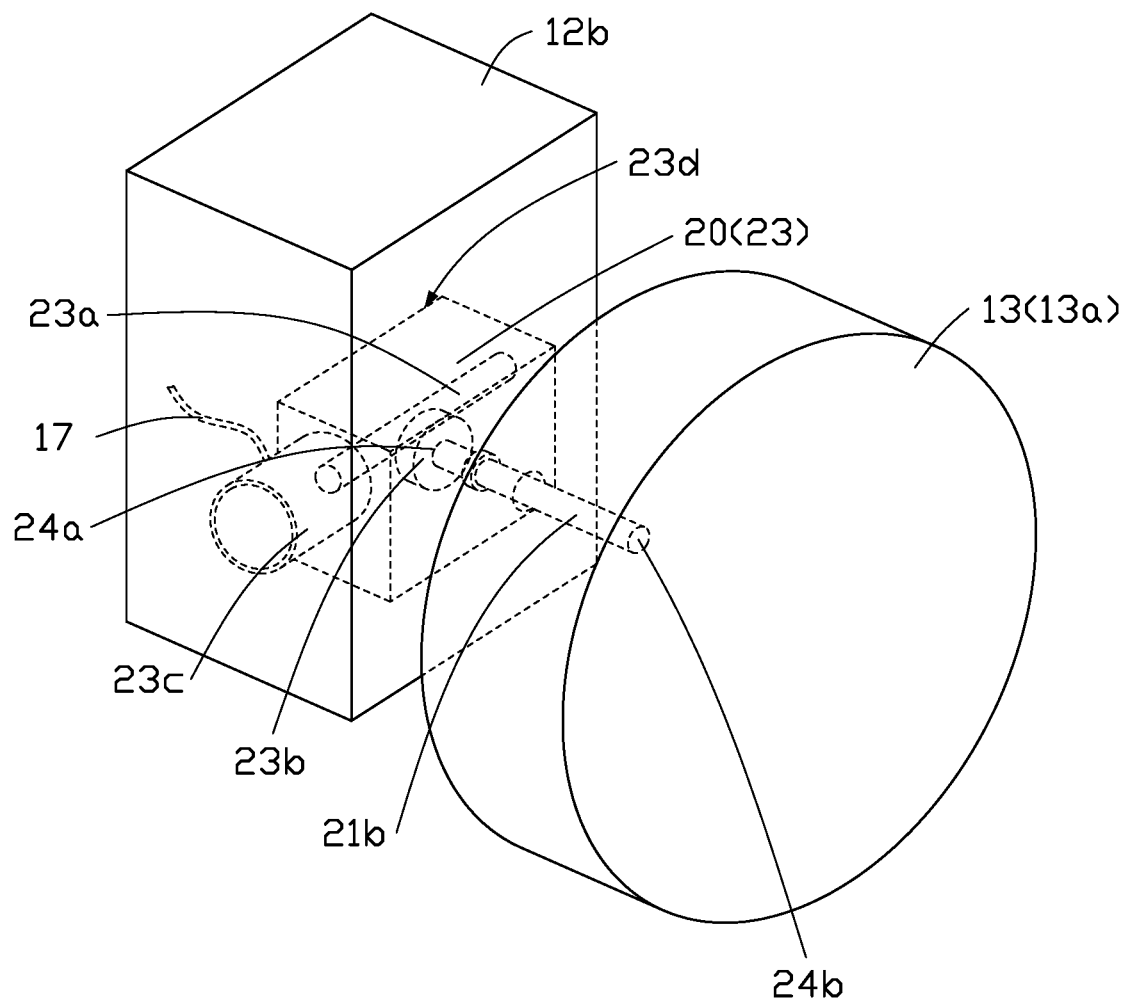
FIG. 3 is a schematic diagram of a second embodiment of a braking device of the warning triangle structure.

Referring to FIG. 2 and FIG. 3, the warning triangle structure 100 further includes a braking device 20. The braking device 20 includes a transmission shaft 21b. A driving module (not shown) provides power to the braking device 20 through a wire 17 to drive the transmission shaft 21b to rotate. The braking device 20 is mounted on one of the connecting rods 12 at the second end 12b. The transmission shaft 21b is connected to the support wheel 13. When the driving module supplies power to the braking device 20, the transmission shaft 21b rotates to drive the support wheel 13 to rotate at the same speed as the transmission shaft 21b. When the driving module stops providing power to the braking device 20, the support wheel 13 stops being rotated by the transmission shaft 21b.

FIG. 2 shows a first embodiment of the braking device 20. In the first embodiment, the braking device 20 is a brake motor 21. The brake motor 21 includes a rotor 21a, the transmission shaft 21b fixedly connected to the rotor 21a, an electromagnet 21c, a spring 22a, a brake disc 22b, a friction plate 22c, and a shell 22d. The shell 22d houses the rotor 21a, the electromagnet 21c, the spring 22a, the brake disc 22b, the friction plate 22c, and a portion of the transmission shaft 21b. The rest of the transmission shaft 21b is outside the shell 22d and connected to the support wheel 13.

The rotation of the rotor 21a drives the transmission shaft 21b to rotate. The electromagnet 21c, the spring 22a, the brake disc 22b, and the friction plate 22c are sleeved on the transmission shaft 21b in sequence on a same side of the rotor 21a. The spring 22a is located between the electromagnet 21c and the brake disc 22b. The spring 22a has two opposite ends, one end of which is fixed to the electromagnet 21c, and the other end of which is fixed to the brake disc 22b. The electromagnet 21c is fixed on the shell 22d, and the electromagnet 21c, the spring 22a, and the brake disc 22b do not rotate with the rotation of the transmission shaft 21b. The friction plate 22c is fixedly connected to the transmission shaft 21b and rotates as the transmission shaft 21b rotates.

When the driving module supplies power to the braking device 20, the rotor 21a rotates, and at the same time, the electromagnet 21c generates a magnetic force and attracts the brake disc 22b to separate from the friction plate 22c, and the spring 22a is compressed. The rotor 21a drives the transmission shaft 21b to rotate, and then the transmission shaft 21b drives the support wheel 13 to rotate. In this circumstance, the warning triangle structure 100 is self-propelled to move on the road.

When the driving module stops supplying power to the braking device 20, the rotor 21a stops rotating, and the magnetic force of the electromagnet 21c disappears. At this time, the spring 22a restores to cause the brake disc 22b and the friction plate 22c to come in contact, so that the friction plate 22c stops rotating, and the transmission shaft 21b is stopped from rotating. At this time, the support wheel 13 connected to the transmission shaft 21b also stops rotating, and the warning triangle structure 100 stops moving. When the warning triangle structure 100 stops moving, the warning triangle structure 100 meets the "ground height test" standard of European regulation ECE R27, that is, when the support wheel 13 is on a test platform at least 5 cm above the ground, the warning triangle structure 100 is able to withstand a wind speed of 60 km/h.

Specifically, the brake motor 21 in this embodiment is installed in the second end 12b of the connecting rod 12 in the middle of the rear side 10b of the base 10. In other embodiments, the brake motor 21 may also be installed in each of the connecting rods 12 located on the front side 10a of the base 10. In this embodiment, the warning triangle structure 100 meets the "ground height test" of the European regulation ECE R27.

FIG. 3 shows a second embodiment of the braking device 20. In the second embodiment, the braking device 20 is a worm gear reducer 23. The worm gear reducer 23 includes a motor 23c, a worm 23a connected to the motor 23c, a worm gear 23b engaged with the worm 23a, a transmission shaft 21b, and a housing 23d. The housing 23d receives the worm 23a, the worm gear 23b, and a portion of the transmission shaft 21b. The rest of the transmission shaft 21b is outside the housing 23d and connected to the support wheel 13.

The motor 23c is electrically connected to the driving module through a wire 17, and the rotation of the motor 23c drives the worm 23a to rotate. The transmission shaft 21b includes a front end 24a and a rear end 24b. The front end 24a is connected to the worm gear 23b, and the rear end 24b is connected to the support wheel 13.

In particular, the worm gear reducer 23 is self-locking, that is, power transmission can only be transmitted by the worm 23a to the worm gear 23b, no external force can cause the worm gear 23b to drive the worm 23a to rotate.

When the driving module provides power to the motor 23c, the motor 23c rotates to drive the worm 23a to rotate. The worm 23a drives the worm gear 23b to rotate. The worm gear 23b drives the transmission shaft 21b to rotate through the front end 24a. At this time, the support wheel 13 connected to the transmission shaft 21b is driven to rotate. Thus, the warning triangle structure 100 is self-propelled to move on the road.

When the driving module stops supplying power to the motor 23c, the motor 23c stops rotating. At this time, the worm 23a mechanically connected to the motor 23c stops rotating, the worm gear 23b and the transmission shaft 21b connected to the worm gear 23b also stop rotating, and the support wheel 13 stops moving. At this time, the warning triangle structure 100 meets the "ground height test" of the European regulation ECE R27.

Specifically, the worm gear reducer 23 in this embodiment is installed in the second end 12b of the connecting rod 12 in the middle of the rear side 10b. In other embodiments, the worm gear reducer 23 may also be installed in each of the connecting rods 12 located on the front side 10a of the base 10. In this embodiment, the warning triangle structure 100 meets the "ground height test" of the European regulation ECE R27.

The wind-resistant design of the first and second embodiments both utilize the cooperation of the braking device 20 and the support wheel 13 to achieve mechanical wind resistance.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A warning triangle structure comprising:
a base;
a triangle comprising a bottom end and a top end opposite the bottom end, the bottom end fixedly mounted to the base;
a plurality of connecting rods, each of the plurality of connecting rods comprising a first end and a second end, the first end fixedly coupled to the base, and the second end mounted with a rotatable support wheel; and
a braking device installed at the second end of at least one of the plurality of connecting rods; wherein:
the braking device comprises a rotor, a transmission shaft fixedly coupled to the rotor, an electromagnet, a spring, a brake disc, a friction plate, and a shell;
the shell houses the rotor, the electromagnet, the spring, the brake disc, the friction plate, and a portion of the transmission shaft, a rest of the transmission shaft is outside the shell and coupled to the rotatable support wheel;
the electromagnet, the spring, the brake disc, and the friction plate are sleeved on the transmission shaft in sequence on a same side of the rotor;
the spring is coupled between the electromagnet and the brake disc;
the electromagnet is fixed on the shell, and the electromagnet, the spring, and the brake disc do not rotate with the rotation of the transmission shaft;
the friction plate is fixedly coupled to the transmission shaft and rotates as the transmission shaft rotates;
when the rotor rotates, the electromagnet generates a magnetic force and attracts the brake disc to separate from the friction plate, the spring is compressed, the rotor drives the transmission shaft to rotate, and the transmission shaft drives the rotatable support wheel to rotate;
when the rotor stops rotating, the magnetic force of the electromagnet disappears, the spring restores to cause the brake disc and the friction plate to come in contact, the friction plate stops rotating, the transmission shaft is stopped from rotating, and the rotatable support wheel coupled to the transmission shaft stops rotating.

2. The warning triangle structure of claim 1, wherein:
an outer surface of the triangle is coated with a reflective material and/or a fluorescent material.

3. The warning triangle structure of claim 1, wherein:
the triangle comprises three sides connected from end to end and cooperatively defining a through hole.

4. The warning triangle structure of claim 3, wherein:
the plurality of connecting rods are coupled to opposite sides of the base.

5. The warning triangle structure of claim 4, wherein:
a quantity of the plurality of connecting rods is three;
one of the plurality of connecting rods is coupled to a middle portion of one side of the base, and the other two of the plurality of connecting rods are respectively coupled to opposite ends of the base on another side of the base.

6. A warning triangle structure comprising:
a base;
a triangle comprising a bottom end and a top end opposite the bottom end, the bottom end fixedly mounted to the base;
a plurality of connecting rods, each of the plurality of connecting rods comprising a first end and a second end, the first end fixedly coupled to the base, and the second end mounted with a rotatable support wheel; and
a worm gear reducer; wherein:
the worm gear reducer comprises a motor, a worm coupled to the motor, a worm gear engaged with the worm, a transmission shaft, and a housing;
the housing receives the worm, the worm gear, and a portion of the transmission shaft, a rest of the transmission shaft is outside the housing and coupled to the rotatable support wheel;
rotation of the motor drives the worm to rotate;
the transmission shaft comprises a front end and a rear end;
the front end is coupled to the worm gear, and the rear end is coupled to the rotatable support wheel;
when the motor rotates to drive the worm to rotate, the worm drives the worm gear to rotate, the worm gear drives the transmission shaft to rotate through the front end, and the rotatable support wheel coupled to the transmission shaft is driven to rotate;
when the motor stops rotating, the worm coupled to the motor stops rotating, the worm gear stops rotating, the transmission shaft coupled to the worm gear stops rotating, and the rotatable support wheel stops rotating.

7. The warning triangle structure of claim 6, wherein:
an outer surface of the triangle is coated with a reflective material and/or a fluorescent material.

8. The warning triangle structure of claim 6, wherein:
the triangle comprises three sides connected from end to end and cooperatively defining a through hole.

9. The warning triangle structure of claim 8, wherein:
the plurality of connecting rods are coupled to opposite sides of the base.

10. The warning triangle structure of claim 9, wherein:
a quantity of the plurality of connecting rods is three;
one of the plurality of connecting rods is coupled to a middle portion of one side of the base, and the other two of the plurality of connecting rods are respectively coupled to opposite ends of the base on another side of the base.

* * * * *